United States Patent
Jacquemont et al.

(10) Patent No.: US 7,025,165 B2
(45) Date of Patent: Apr. 11, 2006

(54) DEVICE TO REDUCE THE VISIBLE AND INFRARED SIGNATURE OF A MILITARY VEHICLE

(75) Inventors: Jacky Jacquemont, Igny (FR); Xavier Poirmeur, Guyancourt (FR)

(73) Assignee: Giat Industries, Versailles (FR)

( * ) Notice: Subject to any disclaimer, the term of this patent is extended or adjusted under 35 U.S.C. 154(b) by 254 days.

(21) Appl. No.: 10/463,543

(22) Filed: Jun. 18, 2003

(65) Prior Publication Data
US 2005/0241874 A1    Nov. 3, 2005

(30) Foreign Application Priority Data
Jun. 28, 2002  (FR)  .................................. 02 08062

(51) Int. Cl.
*B60K 13/04*  (2006.01)
(52) U.S. Cl. ..................... 180/309; 180/68.2
(58) Field of Classification Search ................ 180/309, 180/296, 225, 89.2, 68.1, 68.2; 60/264, 39.5, 60/317–319
See application file for complete search history.

(56) References Cited

U.S. PATENT DOCUMENTS

| 4,099,375 A | * | 7/1978 | Inglee ........................ 60/39.5 |
| 4,215,537 A | * | 8/1980 | Hurley ........................ 60/264 |
| 4,303,035 A | * | 12/1981 | Burns ......................... 114/187 |
| 4,463,653 A | * | 8/1984 | Pusch et al. ................. 89/14.1 |
| 4,535,862 A | | 8/1985 | LeBlanc |
| 4,638,632 A | * | 1/1987 | Wulf et al. ................... 60/319 |
| 4,864,819 A | * | 9/1989 | Steyer ......................... 60/264 |
| 6,055,804 A | * | 5/2000 | Hammond et al. .......... 60/39.5 |
| 6,102,791 A | | 8/2000 | Skoff |
| 6,182,440 B1 | | 2/2001 | Bilenas et al. |
| 6,385,968 B1 | * | 5/2002 | Gustafsson et al. ........... 60/320 |

FOREIGN PATENT DOCUMENTS

| DE | 1 099 799 | 2/1961 |
| DE | 32 21 378 A1 | 12/1983 |
| FR | 2 776 705 | 10/1999 |

* cited by examiner

*Primary Examiner*—Bryan Fischmann
(74) *Attorney, Agent, or Firm*—Oliff & Berridge, PLC

(57) ABSTRACT

A device to reduce the visible and infrared signature of a military combat vehicle by diluting the engine's exhaust and cooling gases. The device includes a caisson receiving both sources of heat flow to ensure a single outlet for both the exhaust gases and the cooling air. The caisson is constituted by an enclosure and a shutter. The enclosure ensures a homogeneous mixture of the two fluids and the shuttering provides a way by which the mixture is evacuated. The air outlet of the dilution device may be positioned between the axles of a wheeled-type vehicle.

5 Claims, 2 Drawing Sheets

DEVICE TO REDUCE THE VISIBLE AND INFRARED SIGNATURE OF A MILITARY VEHICLE

BACKGROUND

The technical scope of the present invention is that of devices intended to reduce the visible and infrared signatures of military vehicles, with respect to their exhaust and cooling gases.

The evolution of the technologies of cameras and thermal sensors allows heat sources, such as an engine's exhaust and cooling gases, to be detected from great distances in a land environment. To improve stealthiness faced with the evolution of infrared sensors, it is thus necessary to reduce the level of energy radiated by the exhaust and cooling gas flows of military vehicles.

Patent FR-2 776 705 proposes an effective device to uniformly dilute the exhaust gases from a military vehicle. The air is cooled in a cooling area and then blown out by a shuttered outlet. This device, however, suffers from a major drawback. In fact, if the design specifications impose high ballistic performances, the shutters become difficult to produce in thicknesses consistent with the vehicle's architecture. On the contrary, if the mass of the shutters is sought to be reduced, this is detrimental to the ballistic protection of the vehicle. Another drawback lies in the fact that the engine's exhaust and cooling gas flows are often separated and have their own evacuation systems, thereby multiplying the number of shutters, and thus the vehicle's vulnerable points.

SUMMARY

So as to overcome these problems of mass and volume, or even of loss of protection, technical solutions need to be found that limit the number of shutters.

The aim of the invention is precisely to improve the stealth of a military vehicle by masking the emission area, whilst retaining the highest level of ballistic protection possible.

The present invention relates to a device to reduce the visible and infrared signature of a military combat vehicle by diluting the engine's exhaust and cooling gases, wherein it comprises a caisson receiving both sources of heat flow to ensure a single outlet for both the exhaust gases and cooling air.

According to one characteristic, the caisson is constituted by an enclosure and a shutter at its external lateral wall, the enclosure ensuring a homogeneous mixture of the two fluids and the shuttering constituting means by which this mixture is evacuated.

According to another characteristic, the caisson is fitted with a silencer and dilution means connected to the vehicle's exhaust system.

According to yet another characteristic, armor plating is positioned between the caisson and the vehicle body.

According to another characteristic, the shuttering is made such as to ensure the effective ballistic protection of the device.

One application of the invention consists in positioning the air outlet of the dilution device under the offset between the axles of a wheeled-type vehicle.

Advantageously, the exhaust system according to the invention allows a mixture of the cooled exhaust gases and air introduced to cool heated elements to be made at a homogenous temperature without generating a gap in the ballistic protection.

Another advantage lies in the fact that the vehicle's ballistic protection and the air evacuation are separated.

Another advantage lies in the fact that, even when the vehicle is accelerating, the amount of smoke and heat is diluted, thereby reducing the vehicle's detectability without reducing its performances.

BRIEF DESCRIPTION OF THE DRAWINGS

Other characteristics, particulars and advantages will become more apparent from the following description, given hereafter by way of illustration and in reference to the appended drawings.

DETAILED DESCRIPTION OF EMBODIMENTS

Figure 1:
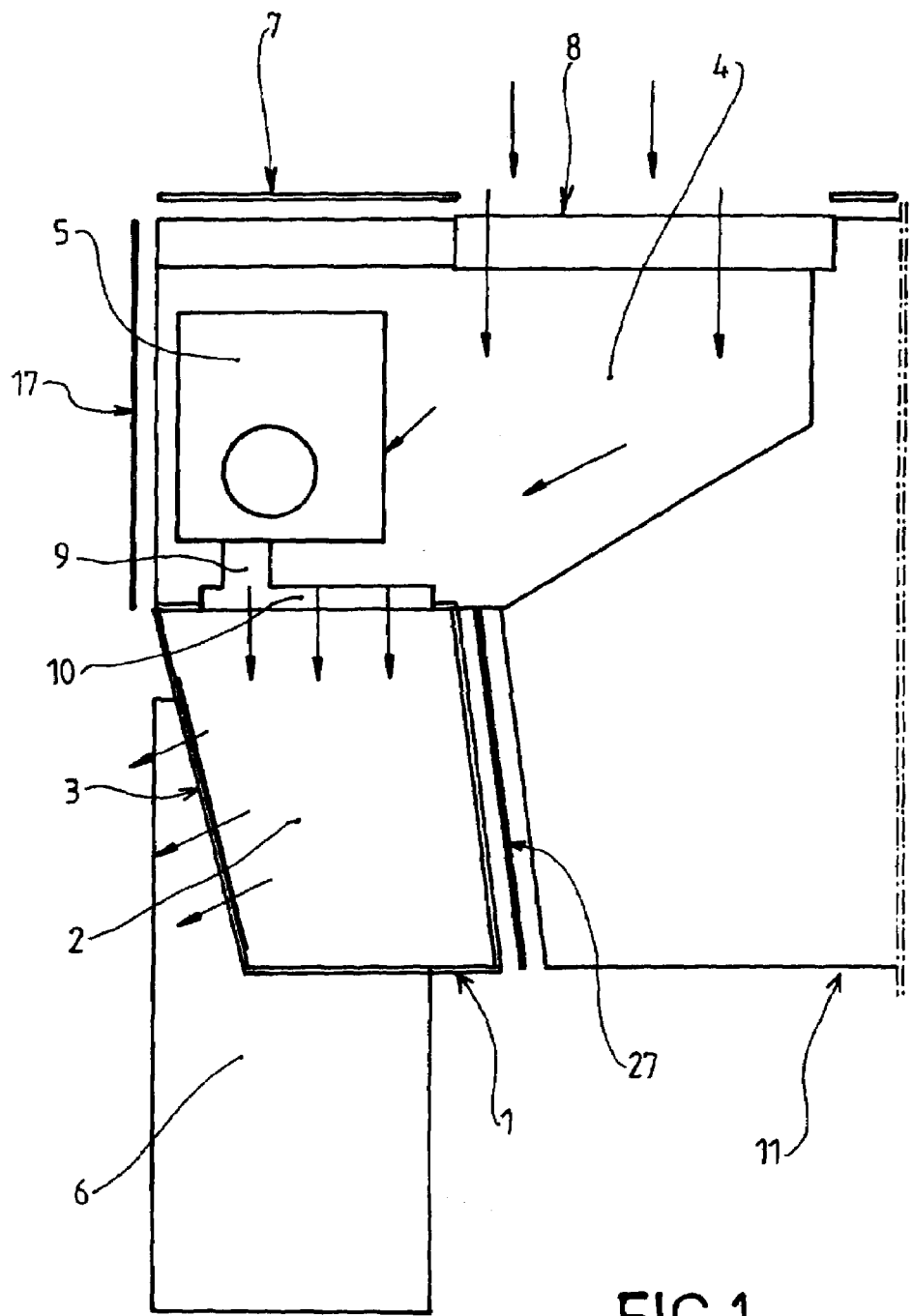
FIG. 1 is a schematic rear section view showing the left rear part of the body of a military vehicle fitted with a device according to the invention.

The invention is intended for military vehicles exposed to ballistic attacks. By way of example to illustrate an application of the invention, we will refer to a combat vehicle of the wheeled armored type. This vehicle is equipped with a combustion engine (diesel engine, for example). This type of engine produces a lot of heat and a cooling system for the engine is thus provided to prevent it from overheating. It is, in particular, the left rear part of the vehicle body 11 that is schematically shown in FIG. 1. The dilution caisson 1 is placed to the rear of the body 11 of the military vehicle.

Figure 2:
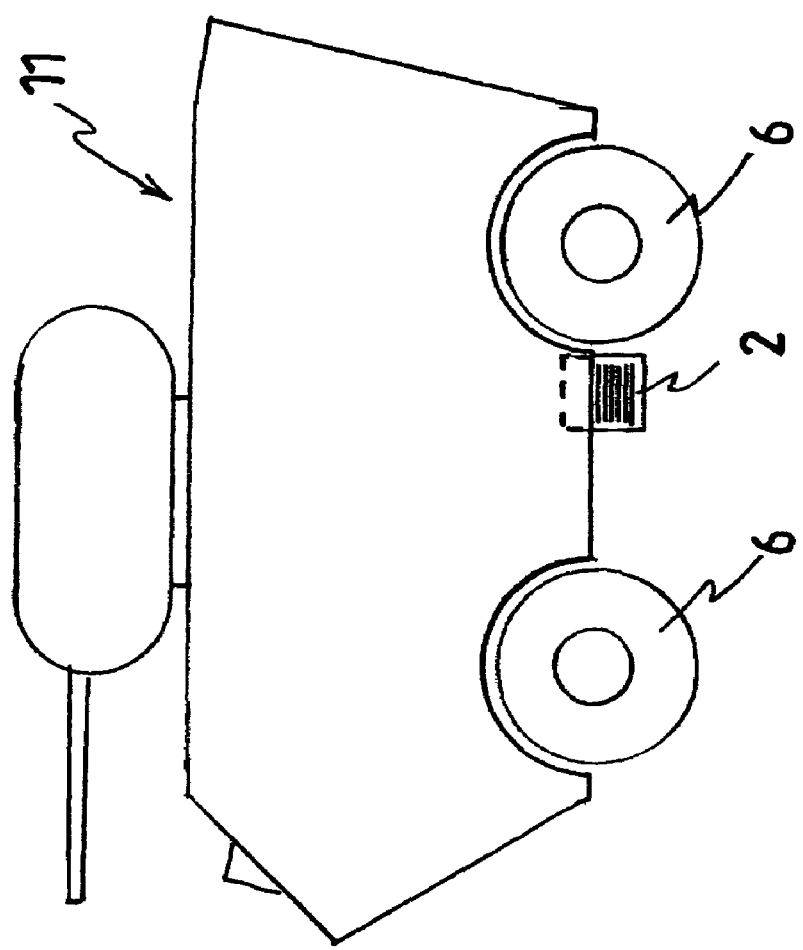
FIG. 2 is a schematic side view of a wheeled vehicle showing a placement of the device.

The dilution caisson 1 is substantially parallelepipedic in shape located in an unoccupied space, this space being, for example, at the rear of the vehicle, between two wheels (FIG. 2), behind the last tire 6, or maybe, in the case of a tracked vehicle, between two idler rollers of the track carriage. It is composed of an enclosure 2 and shuttering 3 on an external lateral wall. The enclosure 2 communicates with two sources of hot fluids: the vehicle's exhaust gases and the engine's cooling air. The exhaust gases are evacuated from the engine by the exhaust system 5, then move through a silencer 9 and dilution member 10 before reaching the enclosure 2. The purpose of the silencer 9 is to attenuate the noise from the engine. In the dilution member 10, the exhaust gases are mixed with fresh air so as to reduce the temperature of these gases.

The air to cool the engine and the other components comes from outside and penetrates into a cooling enclosure 4 by ballistic shuttering 8 arranged on the upper wall of the vehicle body 11. In the cooling enclosure 4 there are the components to be cooled, which may be the vehicle's engine or cooling fins in contact with elements at high temperature (not shown in the drawing). The cooling air for the engine is then evacuated towards the dilution caisson 1. The exhaust gases and the engine cooling air mix together in the enclosure 2 before being evacuated by the shuttering 3. The shuttering 3, as well as the dilution caisson 1 assembly may be slightly armored, but this armoring is not obligatory. In fact, the dilution caisson 1 itself contains no essential elements for the functioning of the vehicle. If it is destroyed, the vehicle will still be able to function, but will lose part of its signature reduction, which is not a major handicap. As the vehicle 11 has already been the target of a projectile attack, this means it has already been spotted. The vehicle 11 itself is armored by means 7 usually used for this type of vehicle. Armoring 27 ensures protection between the vehicle body and the dilution caisson 1. An armoring 17 replaces the formerly used evacuation shuttering placed on the external wall of the vehicle so as to complete and improve the vehicle's protection.

The former shuttering is replaced by normal armoring offering a ballistic protection equivalent to that of the other parts of the vehicle. We can thus see the advantage in the invention, that closes a gap in the ballistic protection of the vehicle.

If the caisson 1 is destroyed, it may be easily replaced without the vehicle body needing to be disassembled.

If the invention is applied to a tracked vehicle, the enclosure 2 may also be positioned near the sprocket wheel, either to its fore or rear, without any major modification to the principle described whilst retaining the advantages brought by the invention.

What is claimed is:

1. A device to reduce the visible and infrared signature of a military combat vehicle by mixing and diluting two fluids including exhaust gases from an engine of the vehicle by means of an exhaust system and cooling air of the engine, the device comprising:

a caisson receiving both of the fluids and providing a single outlet for both fluids after mixing, the caisson having:

an enclosure; and a shuttering at an external lateral wall of the caisson, the enclosure ensuring a homogeneous mixture of the two fluids and the shuttering providing a way by which the mixture is evacuated.

2. The device to reduce the visible and infrared signature of a vehicle according to claim 1, wherein the caisson is fitted with a silencer and a dilution member connected to the exhaust system.

3. The device to reduce the visible and infrared signature of a vehicle according to claim 2, wherein an armor plating is positioned between the caisson and a body of the vehicle.

4. The device to reduce the visible and infrared signature of a vehicle according to claim 3, wherein the shuttering is made such as to ensure the effective ballistic protection of the device.

5. The device to reduce the visible and infrared signature of a vehicle according to claim 1, wherein an outlet is positioned under the vehicle between axles of the vehicle, the vehicle being a wheeled-type vehicle.

* * * * *